United States Patent
Bunel et al.

(10) Patent No.: US 11,280,494 B2
(45) Date of Patent: Mar. 22, 2022

(54) ASSEMBLY FOR A TURBOMACHINE COMBUSTION CHAMBER

(71) Applicant: Safran Aircraft Engines, Paris (FR)

(72) Inventors: Jacques Marcel Arthur Bunel, Moissy-Cramayel (FR); Pierrick Bernard Jean, Moissy-Cramayel (FR)

(73) Assignee: Safran Aircraft Engines, Paris (FR)

(*) Notice: Subject to any disclaimer, the term of this patent is extended or adjusted under 35 U.S.C. 154(b) by 253 days.

(21) Appl. No.: 16/412,958

(22) Filed: May 15, 2019

(65) Prior Publication Data

US 2019/0353351 A1 Nov. 21, 2019

(30) Foreign Application Priority Data

May 16, 2018 (FR) ...................................... 1854082

(51) Int. Cl.

| | |
|---|---|
| *F23R 3/28* | (2006.01) |
| *F02C 7/18* | (2006.01) |
| *F02C 7/22* | (2006.01) |
| *F02C 7/266* | (2006.01) |
| *F23R 3/00* | (2006.01) |
| *F23R 3/06* | (2006.01) |
| *F23R 3/50* | (2006.01) |

(52) U.S. Cl.
CPC .............. *F23R 3/283* (2013.01); *F02C 7/18* (2013.01); *F02C 7/22* (2013.01); *F02C 7/266* (2013.01); *F23R 3/002* (2013.01); *F23R 3/06* (2013.01); *F23R 3/50* (2013.01); *F05D 2240/35* (2013.01)

(58) Field of Classification Search
CPC .... F23R 3/283; F23R 3/28; F23R 3/02; F23R 3/06; F23R 3/002; F23R 3/50; F02C 7/18; F02C 7/22; F02C 7/266
See application file for complete search history.

(56) References Cited

U.S. PATENT DOCUMENTS

| | | | |
|---|---|---|---|
| 6,314,739 B1* | 11/2001 | Howell | F01D 11/005 60/748 |
| 6,557,350 B2* | 5/2003 | Farmer | F23R 3/283 60/39.821 |
| 7,244,104 B2* | 7/2007 | Girgis | F01D 5/081 415/116 |

(Continued)

FOREIGN PATENT DOCUMENTS

| | | |
|---|---|---|
| CA | 2 925 565 A1 | 4/2015 |
| EP | 3 220 049 A1 | 9/2017 |

(Continued)

*Primary Examiner* — Craig Kim
(74) *Attorney, Agent, or Firm* — Blank Rome LLP

(57) ABSTRACT

An assembly for a combustion chamber of a turbomachine. The assembly comprises an annular shell extending along a longitudinal axis, the shell having an inner wall intended to be turned towards a furnace of the combustion chamber and an outer wall opposite the inner wall and a projecting element extending radially from an area of the outer wall. The shell has at least one deflector projecting from the outer wall and located downstream of the projecting element with respect to a direction of gas flow along the outer wall, oriented along the longitudinal axis. The deflector extends circumferentially. Perforations are provided axially between the projecting element and the or each deflector.

12 Claims, 5 Drawing Sheets

(56) References Cited

U.S. PATENT DOCUMENTS

| | | | | |
|---|---|---|---|---|
| 7,721,545 B2* | 5/2010 | Cayre | ............... | F23R 3/14 |
| | | | | 60/737 |
| 8,726,631 B2* | 5/2014 | Rudrapatna | ............ | F02C 7/264 |
| | | | | 60/39.821 |
| 9,080,771 B2* | 7/2015 | Bunel | ............... | F23R 3/06 |
| 9,249,978 B2* | 2/2016 | Richardson | ............ | F23R 3/02 |
| 2007/0051110 A1* | 3/2007 | Holland | ............... | F23R 3/06 |
| | | | | 60/776 |
| 2009/0178385 A1* | 7/2009 | Sandelis | ............... | F02C 7/266 |
| | | | | 60/39.821 |
| 2011/0214428 A1* | 9/2011 | Shershnyov | ............ | F23R 3/06 |
| | | | | 60/754 |
| 2017/0167268 A1* | 6/2017 | Bunker | ............... | F01D 25/12 |

FOREIGN PATENT DOCUMENTS

| | | |
|---|---|---|
| FR | 3 009 747 A1 | 2/2015 |
| FR | 3 055 950 A1 | 3/2018 |
| GB | 2 017 827 A | 10/1979 |

\* cited by examiner

ASSEMBLY FOR A TURBOMACHINE COMBUSTION CHAMBER

This application claims the benefit of French Patent Application No. 1854082, filed on May 16, 2018, the contents of each of which are incorporated herein by reference.

TECHNICAL FIELD

The present invention relates to an assembly for a combustion chamber of a turbomachine.

BACKGROUND

FIG. 1 shows an annular combustion chamber 1 for a turbomachine of the prior art. The combustion chamber 1 has an annular combustion chamber mounted in an external annular casing 2. The combustion chamber 1 includes an outer shell 3 of revolution, an inner shell 4 of revolution, and a bottom of chamber 5 on which fairings extending in the upstream direction are mounted. The terms "upstream" and "downstream" are defined in relation to the direction of the air flow in the turbomachine, this direction being represented by the arrows in FIG. 1.

Fuel injection nozzles 6, distributed around the axis of the turbomachine 7, open into the bottom of the chamber 5, through injection heads 8. Injection systems 9 are arranged around each injection head 8.

The air flow supplied by the turbomachine compressor is guided by the fairings and is divided into a central section intended for supplying the combustion chamber 1 and two peripheral sections 10, 11 intended for bypassing the combustion chamber 1 and forming cooling air.

The injection systems 9 form a swirling air flow into a primary combustion area of the combustion chamber 1. This air is mixed with the fuel sprayed by the injection heads 8, the mixture being ignited by at least one spark plug 12.

The spark plug 12 is mounted, at its outer end, in an orifice 13 of the outer casing 2, by means of an attaching device 14. The inner end 15 of the spark plug 12 passes through an orifice 16 in the outer shell 3, until it is substantially flush with the inner wall 17 of the outer shell 3.

The orifice 16 of the outer shell 3 is equipped with spark plug 12 guide means 18, best seen in FIG. 2. The guide means 18 includes a tubular chimney 19 attached to the outer shell 3 and opening into the chamber 1 through said orifice 16, as well as a guide 20 surrounding the spark plug 12 and mounted with axial and transverse clearance in a groove 21 of the chimney 19, on the chimney 19.

The inner and outer shells 4, 3 of the combustion chamber 1 have primary airstream inlet and secondary airstream 23 orifices 22, and areas with multi-perforations 24 for the passage of the cooling air.

The cooling air flows axially in the downstream direction along the outer wall 25 of the outer shell 3. The guide means 18 of the spark plug 12 (or more generally, any projecting element) form an obstacle disrupting the flow of the cooling air in the area 26 directly downstream of said guide means 18. It appears that this disturbance leads to a decrease in the cooling efficiency in this area 26, which can cause burning 27 and crack initiation 28 phenomena, illustrated in FIG. 3, weakening the structure of the shell.

SUMMARY

One of the aims of the invention is to provide a simple, effective and economical solution to these problems.

For this purpose, the invention relates to an assembly for a combustion chamber of a turbomachine, comprising an annular shell extending along a longitudinal axis, said shell comprising an inner wall intended to be turned towards a furnace of the combustion chamber and an outer wall opposite the inner wall, a projecting element extending radially from an area of the outer wall, characterized in that the shell has at least one deflector projecting from the outer wall and located downstream of the projecting element with respect to a direction of gas flow along the outer wall, oriented along the longitudinal axis, said deflector extending circumferentially, perforations being provided in the shell, axially between the projecting element and the or each deflector, the perforations opening at the level of the inner wall and the outer wall.

The terms inner and outer defining the walls are given by reference to the chimney delimited by the combustion chamber. It should be noted that the combustion chamber may have a radially inner annular shell and a radially outer annular shell. The radial and axial terms are defined in relation to the axis of the turbomachine, which is also the axis of the shell. The shell concerned by the invention may be the radially outer shell or the radially inner shell. The so-called inner wall of the inner shell is then formed by the radially outer wall of said radially inner shell. In addition, the so-called outer wall of the inner shell is formed by the radially inner wall of said radially inner shell.

The presence of the deflector downstream of the projecting element and the fact that the deflector extends circumferentially makes it possible to bring a part of the air flow diverted by the projecting element towards the area less favoured by the air flow circulation. The air then enters the combustion chamber through the perforations. This significantly improves the cooling of the shell in the area directly downstream of the projecting element.

The axial distance between the projecting element and at least one of the deflectors can be between 1 and 5 mm. The shape of the deflector can be adapted to the shape of the projecting element.

The deflector can have a generally curved shape.

More generally, the deflector may have a shape complementary to that of the projecting element.

The curved shape, for example in the form of an arc of a circle or an ellipse portion, appears in particular when viewed from above, i. e. along an axis oriented perpendicular to the axis of the shell.

Such a shape is particularly suitable for cases where the projecting element has a complementary circular or curved shape. In the case of a circular projecting element, the curved deflector can be substantially coaxial.

At least one deflector can extend circumferentially on either side of the projecting element.

In other words, when seen in the downstream direction, at least one deflector protrudes circumferentially on either side of the projecting element. This feature increases the air flow rate captured by the deflector concerned.

At least some of the perforations can be located near the deflector, so that the perforations are positioned as close to the deflector as possible while respecting the manufacturing constraints.

In this way, the air captured by the deflectors flows along the deflectors and is then brought into the combustion chamber through the perforations located directly upstream of the deflector. It may be necessary to reduce the distance between the deflectors and the concerned perforations in order to avoid air stagnation and prevent local increases in the air temperature in this area, reducing the cooling efficiency.

The perforations can be made, at least in part, in the base of the deflector, i. e. in the area of the connection between the deflector and the shell.

The assembly may comprise a plurality of deflectors axially offset from each other, with perforations being provided axially between the projecting element and the deflector and axially between the deflectors.

Thus, for each deflector, perforations are located upstream, or even directly upstream, of the deflector.

The use of multiple deflectors maximizes the flow of air captured and guided by the deflectors to the critical area directly downstream of the projecting element. This improves cooling in this area.

The use of several deflectors also increases the heat exchange surface between the shell and the cooling air.

At least one deflector can be tilted axially upstream of the outer wall.

This feature allows for better capture and guidance of the cooling air.

The distance between the outer end of each deflector and the outer wall of the shell can gradually increase in the downstream direction and/or circumferentially, from a circumferentially median area of the deflector for example.

In other words, the radial size of the deflectors gradually increases in the downstream direction, which makes it possible to better capture and guide the air.

The assembly may comprise a plate, the deflectors being formed on the plate, the projecting element being mounted or formed on the plate, the plate being attached on the shell and forming a part of said shell.

The plate can be attached by welding or brazing to the shell.

The plate can be produced by an additive manufacturing process, such as melting or selective sintering of powders using a laser or an electron beam, for example.

The projecting element may include means for guiding a spark plug.

The means for guiding the spark plug may include a tubular chimney attached on the outer shell or on the plate, and opening into the chamber through an orifice of the outer shell or plate, as well as an annular guide surrounding the spark plug and mounted with axial and transverse clearance on the chimney.

The shell and/or the plate may have perforations, also called multi-perforations, due to their large number, as is known per se. The shell can also have holes for the passage of the so-called primary airstream and holes for the passage of the secondary airstream. The secondary airstream holes are located axially downstream of the primary airstream holes.

The perforations located near the deflectors can have a diameter between 0.2 and 1 mm, preferably between 0.4 and 0.6 mm. The multi-perforations of the shell and/or plate can have a diameter between 0.2 and 1 mm, preferably between 0.4 and 0.6 mm. The multi-perforations can be achieved by laser drilling and/or additive manufacturing.

The perforations and/or the multi-perforations may be inclined with respect to the outer wall of the shell, at an angle between 10 and 50°, for example at an angle of around 30°. The perforations and/or the multi-perforations may be located at least partially in a plane passing through the axis of the shell. Alternatively, at least a part of the perforations and/or the multi-perforations may be formed in one or more planes forming an angle with the axis of the shell, for example an angle between 30° and 90° inclusive. Such perforations or multi-perforations are referred to as giratory.

The primary airstream holes can have a diameter between 1 and 15 mm and the secondary airstream holes can have a diameter between 4 and 12 mm.

The multi-perforations of the plate can be made after attaching the plate to the rest of the shell. In the event that a thermal barrier coating is applied to the inner wall of the shell, and in particular to the perforations located in the vicinity of the deflectors, such a coating may clog said perforations. In order to unclog said perforations, a water jet unclogging treatment may be used. The thermal barrier coating is made of yttrium zirconate, for example.

The invention also relates to a turbomachine for an aircraft comprising an assembly of the aforementioned type.

The invention will be better understood and other details, characteristics and advantages of the invention will appear when reading the following description, which is given as a non-limiting example, with reference to the attached drawings.

DETAILED DESCRIPTION

Figure 1:
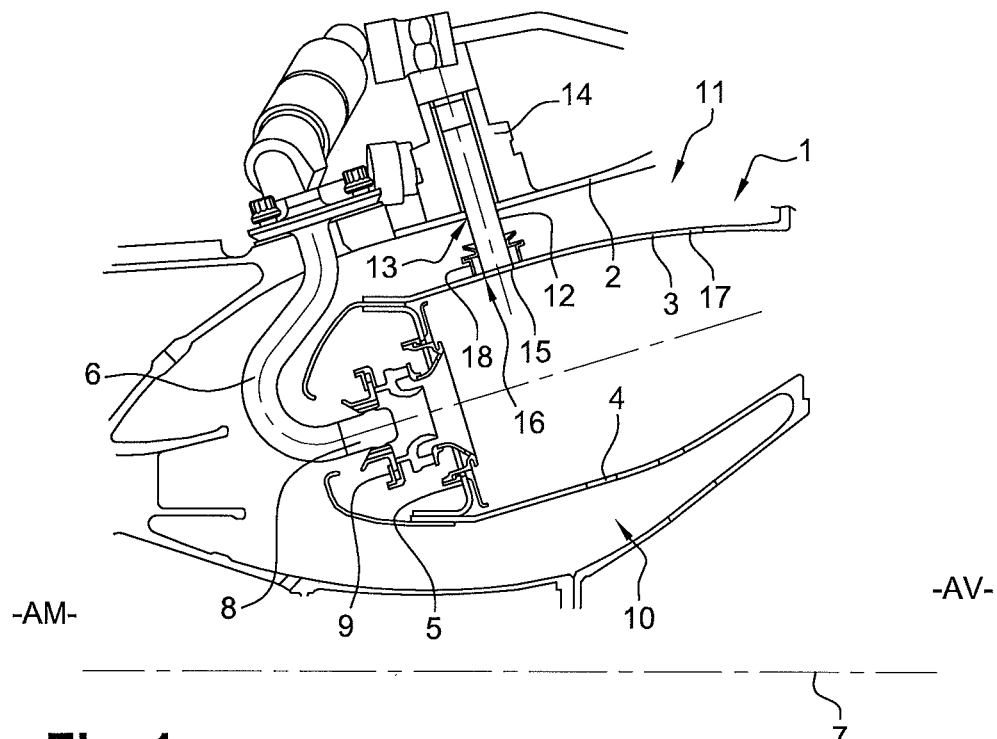
FIG. 1 is an axial cross-sectional view of a combustion chamber of the prior art.
Figure 2:
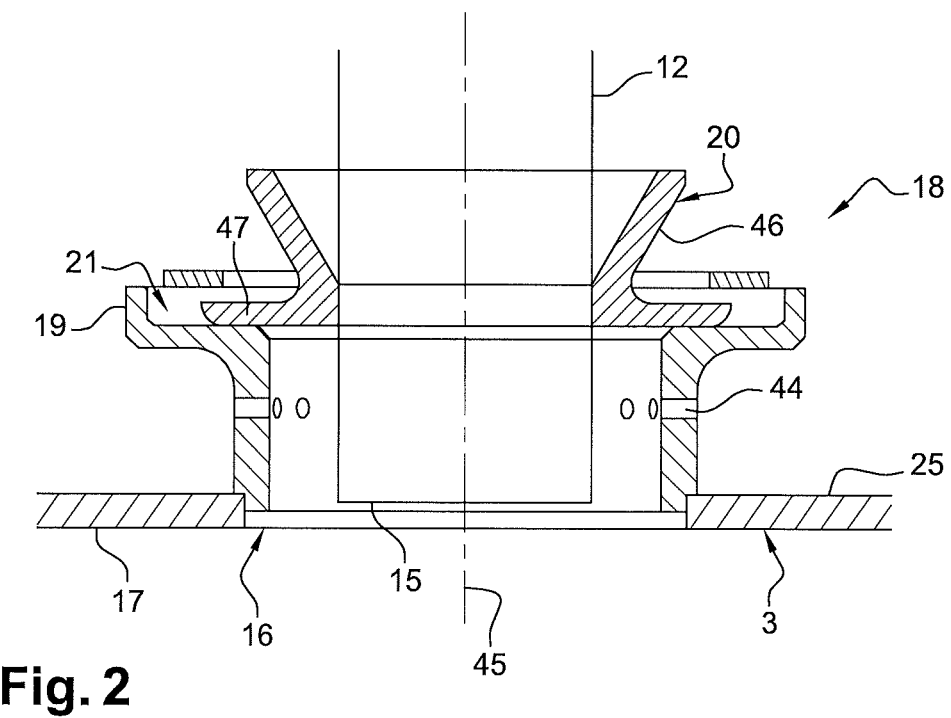
FIG. 2 is an axial cross-sectional view of the spark plug guide means and a part of the outer shell of the combustion chamber of FIG. 1.
Figure 3:
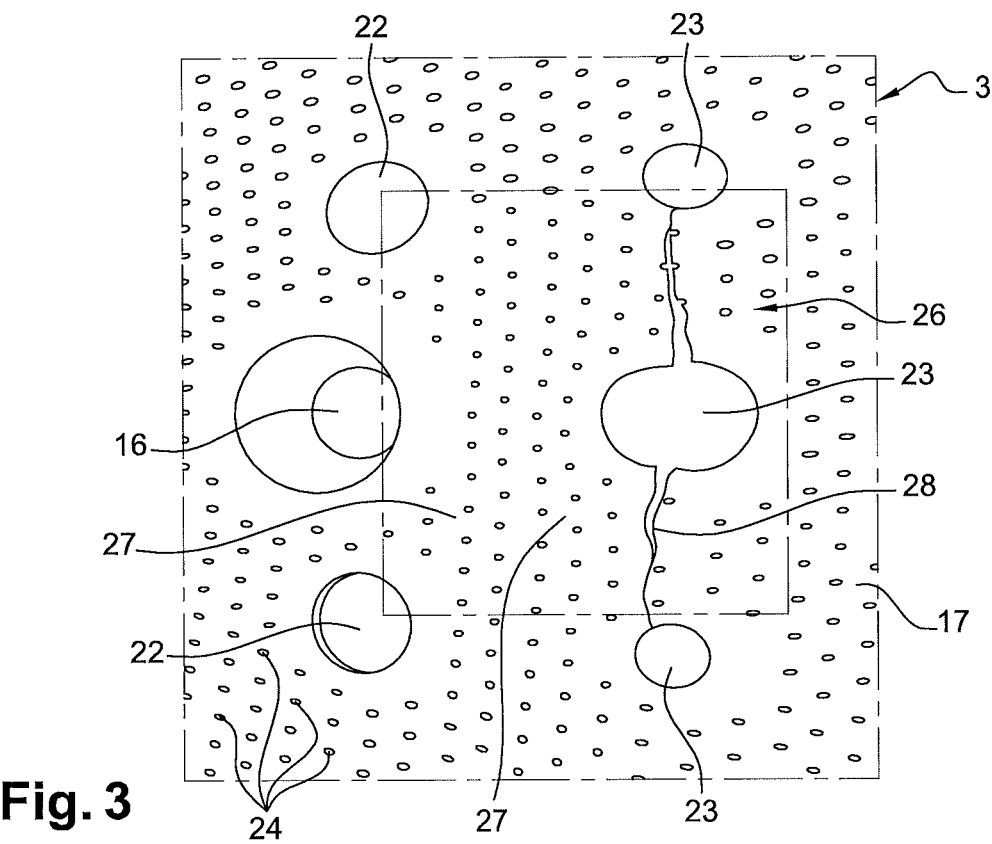
FIG. 3 is a top view of the outer shell, illustrating the cracks or clinks that may appear in the case of the prior art.
Figure 4:
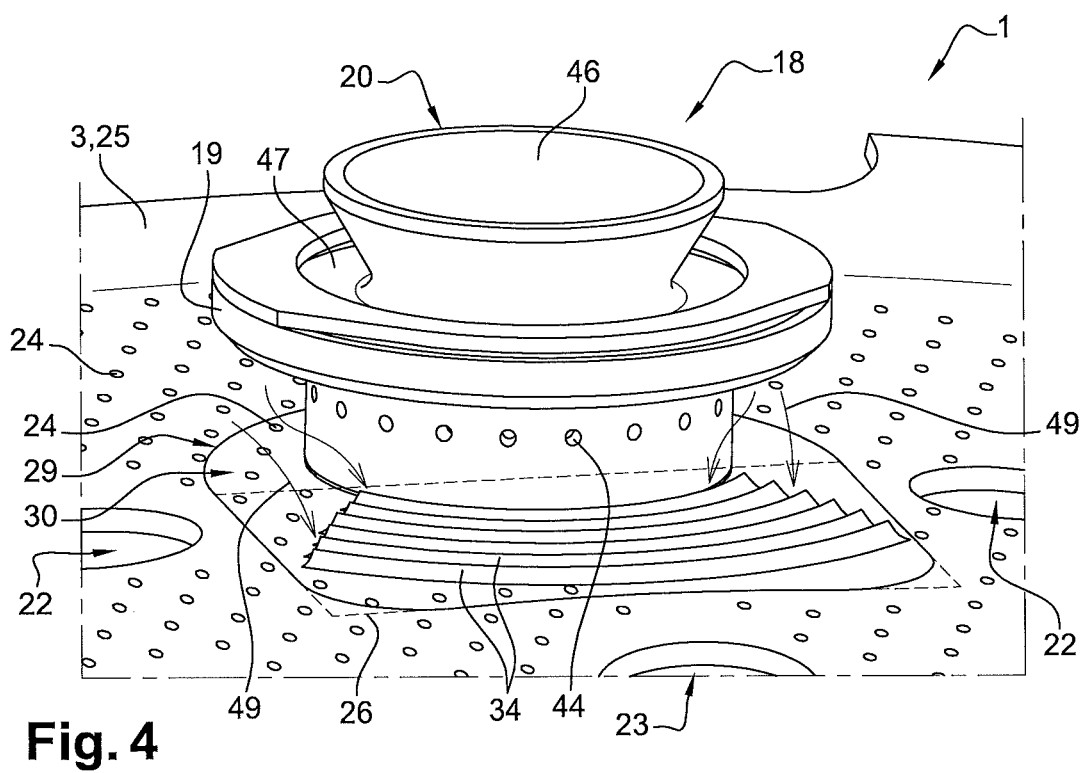
FIG. 4 is a perspective view of a part of an assembly according to one embodiment of the invention, as seen in the upstream direction.
Figure 5:
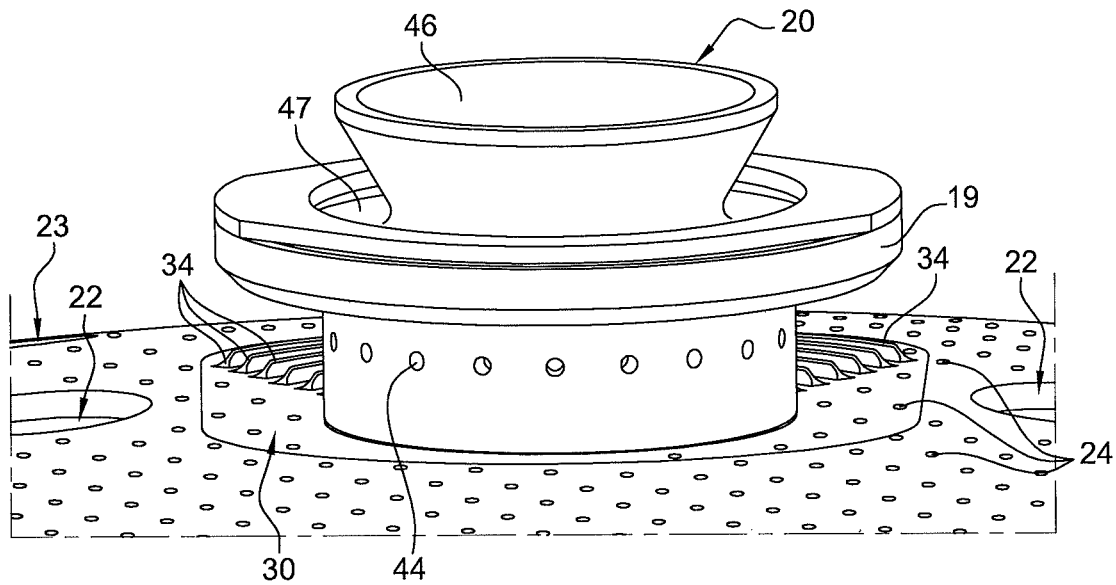
FIG. 5 is a perspective view of a part of an assembly according to one embodiment of the invention, as seen in the downstream direction.
Figure 6:
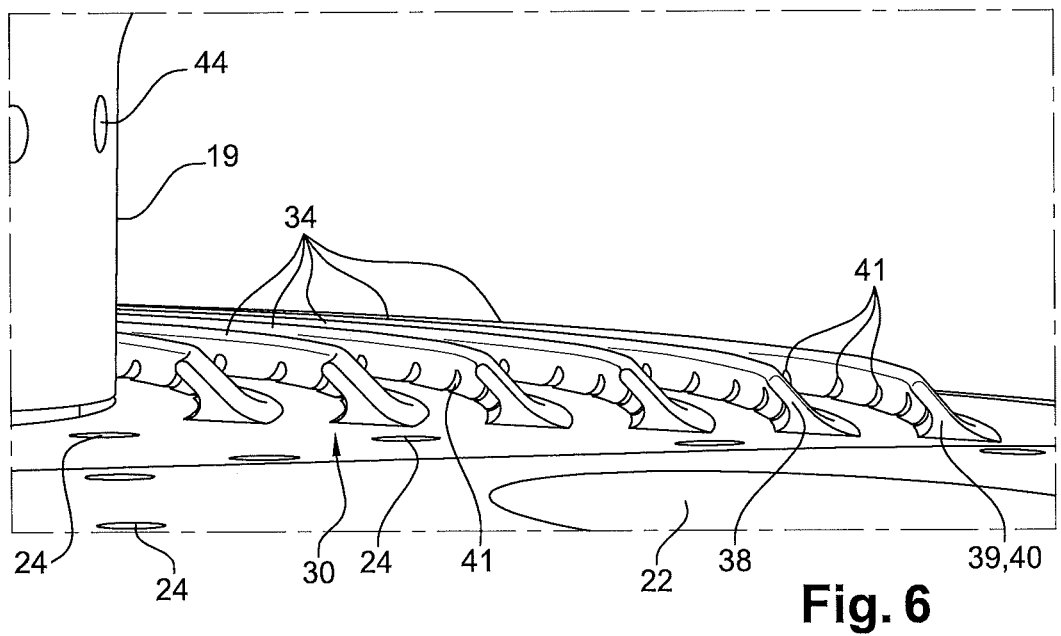
FIG. 6 is a detailed perspective view showing specifically the deflectors.

FIGS. 4 to 6 show a part of an assembly for a combustion chamber 1 for a turbomachine according to one embodiment of the invention. The assembly includes an annular shell, for example the outer shell 3 extending along a longitudinal axis 7. The shell 3 has an inner wall 17 intended to face a firebox in the combustion chamber 1 and an outer wall 25 opposite the inner wall 17.

The shell 3 also has an opening for mounting and attaching a plate 30.

The plate 30 has, seen radially from the outside towards the inside, an upstream area 31 having a semicircular shape and a downstream area 32 having a generally square or rectangular shape with rounded corners.

The plate 30 has a central opening 33 intended for a spark plug 12 to pass therethrough. Said opening 33 is circular in shape. In addition, the plate 30 has curved deflectors 34, for example in an arc of a circle, so that they generally conform to the shape of the opening 33, and are located downstream of the opening 33. Here, the plate 30 has six deflectors 34, for example evenly spaced axially from each other. The deflectors 34 can be regularly spaced in a homogeneous thermal environment, the spacing may vary if the area covered is large. The axial distance between the deflectors 34 is for example between 1 and 5 mm.

The deflectors 34 are centred circumferentially with respect to a median plane 35 passing through the axis 7 of the shell and the axis 37 substantially perpendicular to the elongation axis of the chamber of the opening of the plate 30. The plane 35 is also perpendicular to the plate 30.

The deflectors 34 extend circumferentially over an angular range between 40 and 180°, said angular range being defined with respect to the axis of the chimney 19.

It should be noted that for each deflector 34, the deflector 34 located upstream extends over a smaller angular range than the deflector 34 located directly downstream. In other words, the deflectors 34 located upstream are shorter than the deflectors 34 located downstream.

As it is best seen in FIG. 6, each deflector 34 has an inclined wall 38 with respect to the axial direction and the radial direction. In particular, the angle of the inclined wall 38 in the upstream direction with respect to the radially outer surface of the shell 3 is between 10 and 80°. Said inclined wall 38 of each deflector 34 is connected to the plate 30 by a rounded connection area 39 forming a fillet 40. Perforations 41 are provided in the plate 30 at the fillet 40 of each deflector 34. For example, the perforations 41 are evenly distributed along each deflector 34. The plate 30 has, for each deflector 34, a number of perforations 41 between 10 and 50. Each perforation 41 extends at an angle α between 10 and 60°, for example about 30° with respect to the axial direction. For example, the perforations 41 have a diameter between 0.2 and 1 mm, preferably between 0.4 and 0.6 mm.

In the embodiment shown in FIGS. 4 to 6 in particular, the deflectors 34, for example, all extend radially over the same distance.

Figure 7:
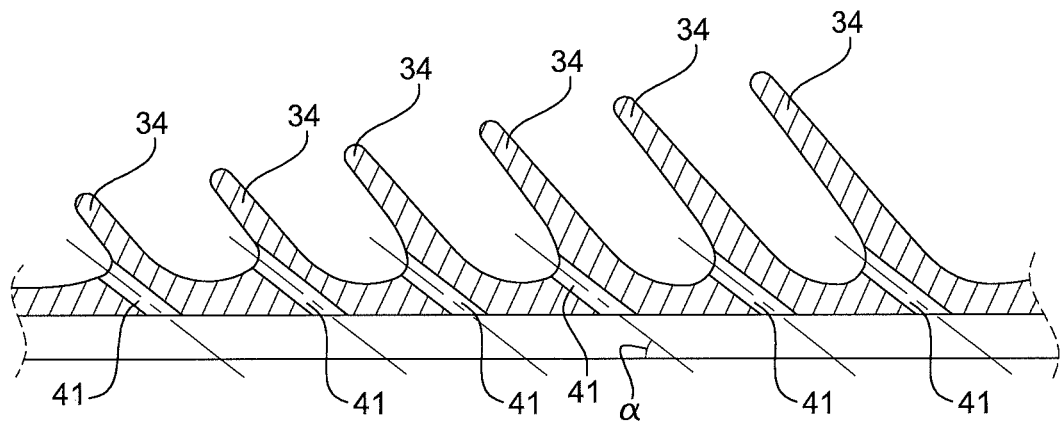
FIG. 7 is a detailed schematic view illustrating an alternative embodiment of the invention.
Figure 8:
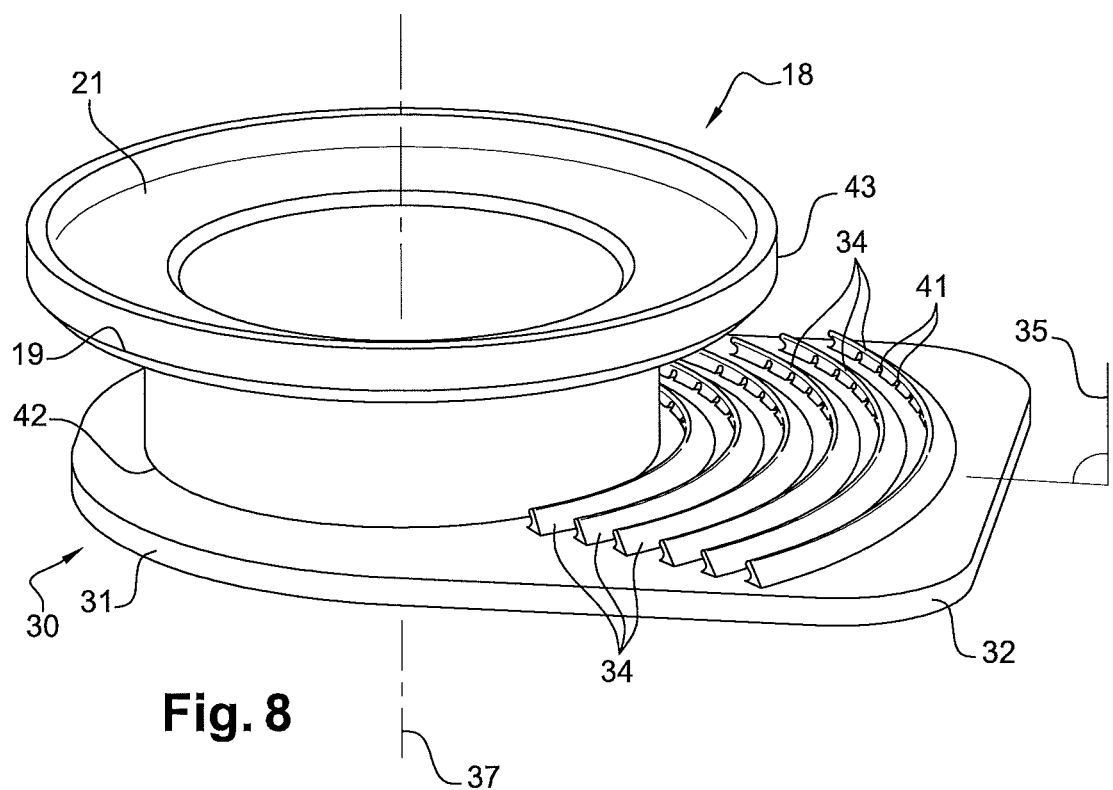
FIG. 8 is a perspective view showing the plate and a part of the guide means according to one embodiment of the invention.

According to an alternative embodiment illustrated in FIG. 7, the radial extension distance of the deflectors 34 increases gradually in the downstream direction.

The plate 30 is attached to the shell 3 by welding or brazing, for example.

Figure 9:
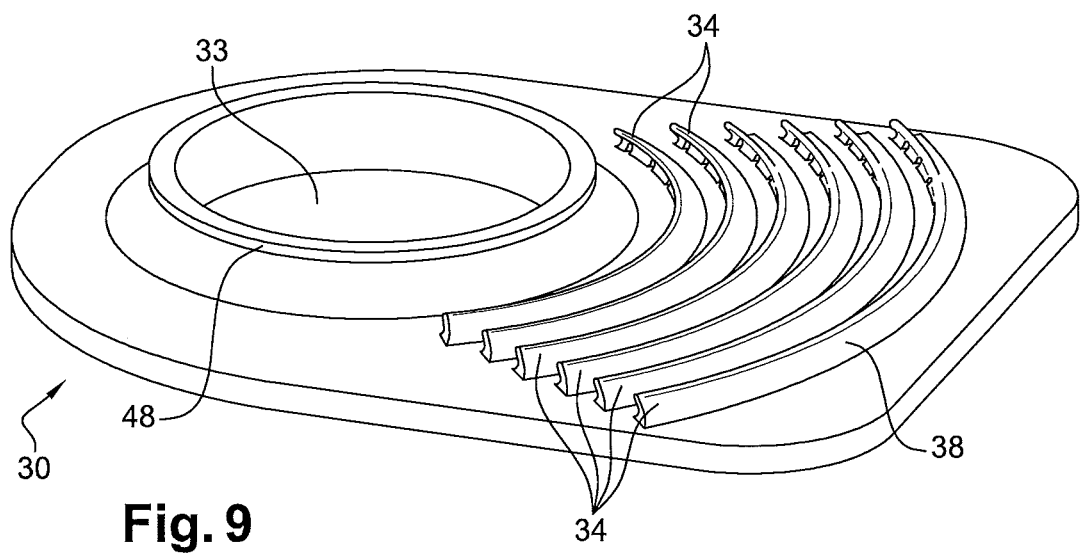
FIG. 9 is a perspective view showing the plate and a part of the guide means according to another embodiment of the invention.

Means 18 for guiding the spark plug 12 are mounted on the plate 30, at the opening 33 (FIG. 9). The guide means 18 comprises a tubular chimney 19 having a first end 42 attached to the plate 30, for example by welding, and surround the opening 33 of the plate 30, and an opposite second end 43, with a larger diameter than the first end 42, and define an annular groove 21. The chimney 12 and the plate 30 can, as an alternative, be formed in one single piece. The chimney 19 may have holes 44 oriented perpendicularly to axis 45 of the chimney 19 and distributed over the circumference of the chimney 19.

An annular guide 20 is mounted on the chimney 19. The guide 20 has a frustoconical wall 46 widening opposite the shell 3 and an annular flange 47 mounted with radial and axial clearance in the groove 21 of the chimney 19, as known per se. The spark plug 12 is intended to be engaged into the guide 20 and the chimney 19, the inner end 15 of the spark plug 12 passing through the opening 33 of the plate 30, until it is substantially flush with the inner surface 17 of the shell 3.

The shell 3 and the plate 30 have perforations 24, also called multi-perforations 24 because of their large number. The shell 3 also has holes for the passage of the so-called primary airstream 22 and holes for the passage of the secondary airstream 23. The secondary airstream holes 23 are located axially downstream of the primary airstream holes 22.

The multi-perforations 24 of the shell 3 and/or the plate 30, can have a diameter between 0.2 and 1 mm, preferably between 0.4 and 0.6 mm. The multi-perforations 24 can be performed by laser drilling.

The perforations 41 and/or the multi-perforations 24 can be inclined with respect to the outer wall 25 of the shell 3, at an angle α between 10 and 50°, for example around 30°. The perforations 41 and/or the multi-perforations 24 may be located at least partially in a plane passing through the axis 7 of the shell. Alternatively, at least a part of the perforations 41 and/or the multi-perforations 24 may be formed in one or more plane(s) forming an angle with the axis 7 of the shell, for example an angle between 30 and 90° inclusive. Such perforations 41 or multi-perforations 24 are said giratory.

The primary airstream holes 22 can have a diameter between 5 and 15 mm and the secondary airstream holes 23 can have a diameter between 4 and 12 mm.

The multi-perforations 24 of the plate 30 can be made after attaching the plate 30 to the rest of the shell 3.

The plate 30 and the shell 3 can be formed in one single piece. In general and structurally, it can be considered that the plate 30 is part of the shell 3.

Figure 10:
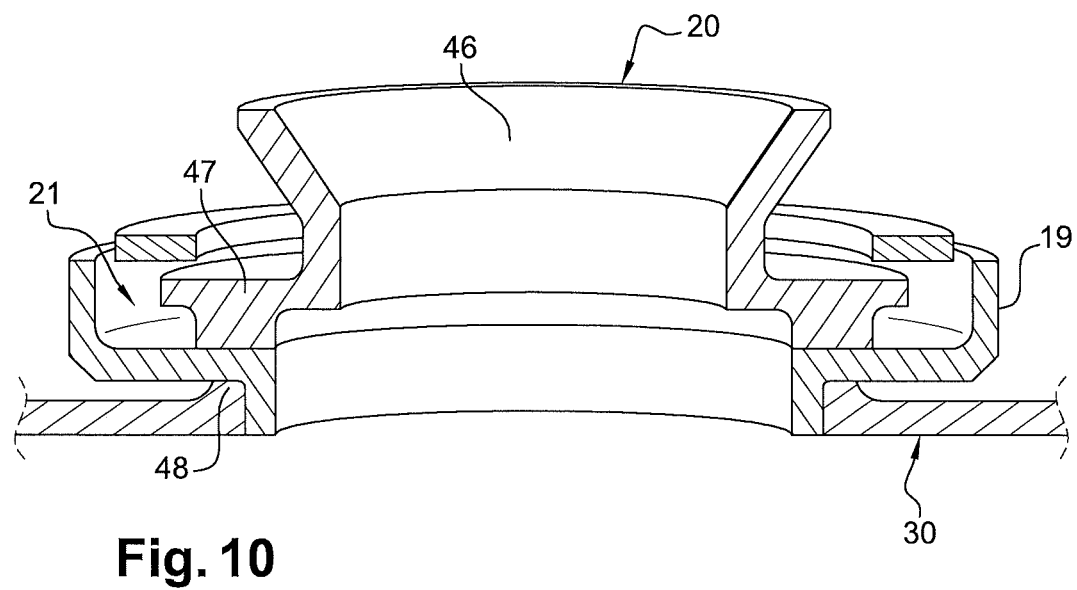
FIG. 10 shows the guide means intended to be mounted on the plate of FIG. 9.

FIGS. 9 and 10 illustrate another embodiment, which differs from the one shown above in that the plate 30 has an annular flange 48 extending radially outward and surrounding the opening 33 of the plate 30. The second end 43 of the chimney 19 forms a radial annular shoulder, resting on the outer end of the flange 48. The flange 48 is made in one piece with the plate 30.

The plate 30 can be produced by an additive manufacturing process, such as melting or selective sintering of powders using a laser or an electron beam, for example. The plate 30 is for example made For example, the shell 3 is made of a cobalt-based alloy, such as a Hastelloy or HA188 alloy.

The shell can be a radially outer shell, as described above, or a radially inner shell 4 of a turbomachine combustion chamber.

The deflectors 34 downstream of the guide means 18 make it possible to bring a part of the air flow 49 (represented in FIG. 4) diverted by the projecting element 18 towards the area 26 less favoured by the circulation of the air flow 49. Air then enters the combustion chamber 1 through the perforations 24, 41. This significantly improves the cooling of the shell 3, 4 in the area 26 directly downstream of the projecting element 18. It should be noted that all or part of the deflectors 34 extend circumferentially on either side of the chimney 19 so as to capture and guide a larger part of the air flow 49 to the area 26 concerned.

It should be noted that the invention is applicable to any projecting element 18 of the shell 3, 4, and is not limited to the case of guiding means 18 of a spark plug 12.

The invention claimed is:

1. An assembly for a combustion chamber of a turbomachine, the assembly comprising:
    an annular shell extending along a longitudinal axis, said shell comprising an inner wall configured to be turned towards a furnace of the combustion chamber and an outer wall opposite the inner wall;
    a projecting element extending radially from an area of the outer wall; and
    a plate attached to the shell and forming a part of said shell, the plate comprising:

at least one plurality of deflectors configured as inclined walls integral with and projecting from the outer wall and connected thereto by respective rounded connection areas configured as fillets, the at least one plurality of deflectors located downstream of the projecting element with respect to a direction of gas flow along the outer wall, oriented along the longitudinal axis, wherein each deflector of the at least one plurality of deflectors extends circumferentially, is axially offset from other deflectors, and perforations arranged axially between the projecting element and each of the at least one plurality of deflectors, axially between the at least one plurality of deflectors and at the respective fillet, and opening at the inner wall and the outer wall.

2. The assembly according to claim 1, wherein each of the at least one plurality of deflectors has a general shape of a curve.

3. The assembly according to claim 1, wherein at least one deflector of the at least one plurality of deflectors extends circumferentially with respect to the projecting element on either side of the projecting element.

4. The assembly according to claim 1, wherein at least some of the perforations are located in the vicinity of the at least one plurality of deflectors.

5. The assembly according to claim 1, wherein at least one deflector of the at least one plurality of deflectors is inclined axially in the upstream direction with respect to the outer wall.

6. The assembly according to claim 2, wherein the distance between the outer end of each deflector of the at least one plurality of deflectors and the outer wall of the shell gradually increases in the downstream direction.

7. The assembly according to claim 1, wherein the projecting element is mounted or formed on the plate.

8. The assembly according to claim 1, wherein the projecting element has means for guiding a spark plug.

9. A turbomachine for an aircraft, the turbomachine comprising the assembly according to claim 1.

10. An assembly for a combustion chamber of a turbomachine, the assembly comprising:

an annular shell extending along a longitudinal axis, said annular shell comprising an inner wall intended to be turned towards a furnace of the combustion chamber and an outer wall opposite the inner wall; and a projecting element extending radially from an area of the outer wall, wherein the annular shell comprises a plurality of deflectors projecting from the outer wall and located downstream of the projecting element with respect to a direction of gas flow along the outer wall, oriented along the longitudinal axis, the plurality of deflectors being arranged concentrically around the projecting element, perforations being provided in the shell, axially between the projecting element and each of the plurality of deflectors, and axially between the plurality of deflectors, with the perforations opening at the inner wall and the outer wall, and wherein the plurality of deflectors has a last deflector arranged furthest from the projecting element, and all deflectors of the plurality of deflectors other than the last deflector are arranged between the last deflector and the projecting element.

11. The assembly according to claim 1, wherein the at least one of the plurality of deflectors are arranged concentrically around the projecting element, the at least one of the plurality of deflectors has a last deflector arranged furthest from the projecting element, and all deflectors of the at least one of the plurality of deflectors other than the last deflector are arranged between the last deflector and the projecting element.

12. The assembly according to claim 10, wherein the plurality of deflectors are integral with the outer wall.

* * * * *